US009873345B2

(12) United States Patent
Abreu

(10) Patent No.: US 9,873,345 B2
(45) Date of Patent: Jan. 23, 2018

(54) DISTRIBUTED CHARGE MANAGEMENT SYSTEM FOR ELECTRIC VEHICLES

(71) Applicant: Talino EV Management Systems, Inc., Stamford, CT (US)

(72) Inventor: Enrique Abreu, Stamford, CT (US)

(73) Assignee: TALINO EV MANAGEMENT SYSTEMS, INC., Stamford, CT (US)

( * ) Notice: Subject to any disclaimer, the term of this patent is extended or adjusted under 35 U.S.C. 154(b) by 956 days.

(21) Appl. No.: 13/865,389

(22) Filed: Apr. 18, 2013

(65) Prior Publication Data

US 2014/0312837 A1 Oct. 23, 2014

(51) Int. Cl.
*H02J 7/00* (2006.01)
*B60L 11/18* (2006.01)

(52) U.S. Cl.
CPC ......... *B60L 11/1824* (2013.01); *B60L 11/184* (2013.01); *B60L 11/1805* (2013.01); *B60L 11/185* (2013.01); *B60L 11/1816* (2013.01); *B60L 11/1844* (2013.01); *B60L 11/1846* (2013.01); *B60L 11/1848* (2013.01); *B60L 2200/12* (2013.01); *B60L 2210/30* (2013.01); *B60L 2240/622* (2013.01); *B60L 2240/70* (2013.01); *B60L 2240/80* (2013.01); *B60L 2250/10* (2013.01); *Y02E 60/721* (2013.01); *Y02T 10/7005* (2013.01); *Y02T 10/7072* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
CPC ... Y02T 90/14; Y02T 10/7005; Y02T 90/128; Y02T 10/7088; Y02T 90/163

USPC ......................................................... 320/109
See application file for complete search history.

(56) References Cited

U.S. PATENT DOCUMENTS

| 8,314,587 | B2 | 11/2012 | White et al. | |
|---|---|---|---|---|
| 2008/0275600 | A1 | 11/2008 | Rask et al. | |
| 2008/0281663 | A1 | 11/2008 | Hakim et al. | |
| 2009/0198372 | A1 | 8/2009 | Hammerslag | |
| 2009/0246596 | A1* | 10/2009 | Sridhar et al. | 429/34 |
| 2010/0114798 | A1 | 5/2010 | Sirton | |
| 2010/0141203 | A1* | 6/2010 | Graziano et al. | 320/109 |
| 2010/0145837 | A1 | 6/2010 | Graziano et al. | |
| 2010/0241560 | A1 | 9/2010 | Landau-Holdsworth et al. | |
| 2012/0161699 | A1 | 6/2012 | Chiang et al. | |
| 2013/0024306 | A1* | 1/2013 | Shah et al. | 705/17 |
| 2013/0054069 | A1 | 2/2013 | Komiya et al. | |
| 2013/0166119 | A1 | 6/2013 | Kummer et al. | |
| 2013/0179061 | A1 | 7/2013 | Gadh et al. | |
| 2013/0217409 | A1 | 8/2013 | Bridges et al. | |
| 2013/0274975 | A1 | 10/2013 | Gregg et al. | |
| 2013/0282472 | A1 | 10/2013 | Penilla et al. | |
| 2013/0320772 | A1 | 12/2013 | Qiao et al. | |
| 2014/0002027 | A1 | 1/2014 | Guan | |
| 2014/0249706 | A1 | 9/2014 | Abreu | |

FOREIGN PATENT DOCUMENTS

| JP | 2004-166367 A | 6/2004 |
|---|---|---|
| WO | 2006/018695 | 2/2006 |
| WO | 2010/137462 | 12/2010 |

* cited by examiner

*Primary Examiner* — Arun Williams
(74) *Attorney, Agent, or Firm* — Occhiuti & Rohlicek LLP

(57) ABSTRACT

An apparatus for charging an electric vehicle includes a DC voltage source, and a charge dispenser connected to the DC voltage source. The charge dispenser is configured to receive first data from a remote clearinghouse and to control charging of the electric vehicle based at least in part on that received first data.

19 Claims, 8 Drawing Sheets

DISTRIBUTED CHARGE MANAGEMENT SYSTEM FOR ELECTRIC VEHICLES

FIELD OF DISCLOSURE

This disclosure relates to electric vehicles, and in particular, to delivery of charge to a battery of an electric vehicle.

BACKGROUND

Electric vehicles periodically need charging. Currently, the most common place to charge an electric vehicle is at home. In that case, the cost of the required electricity is reflected on the homeowner's electric bill.

A limited number of public charging stations is also available. When charging at these stations, the cost of electricity to the consumer is zero. However, the electricity must still be purchased from an electric power utility. Given the economics, it is not surprising that there are so few of these public charging stations.

An obvious solution is to maintain a public charging station in which the owner of the electric vehicle actually pays for the electricity would not be difficult to implement. After all, it is known to provide a current meter or similar device to measure current. And one can simply couple a credit card reader to such a device to accept payment for the electricity consumed. This, after all, is how the problem is solved at gas stations.

Unfortunately, the economics of charge delivery are not amenable to such a solution. For one thing, one can fill a car with gasoline in a matter of minutes. In contrast, it can take hours to fully charge an electric vehicle. In addition, gasoline tends to be more expensive than electricity. Thus, the revenue per fuel delivery device would be lower for an electrical charging station than it would be for a gasoline pump.

The obvious solution is to raise the cost of charging at a public charging station until it makes economic sense to maintain such a station. However, the ready availability of residential electricity constrains the price elasticity of publicly delivered. In contrast, one cannot save money by simply filling up a car at home with gasoline.

The ironic result is that the low cost of electricity as a fuel source eliminates virtually any economic incentive to maintain public electrical charging stations in which charge can be delivered for a fee. This, in turn, hinders the widespread adoption of electric vehicles.

Clearly, some system and method is needed to enhance the economic viability of public charging stations. Such a system would encourage widespread availability of low-cost public electrical charging stations. This, in turn, will ignite greater demand for electric vehicles.

SUMMARY

In one aspect, the invention features an apparatus for charging an electric vehicle. Such an apparatus includes a DC voltage source, and a charge dispenser connected to the DC voltage source. The charge dispenser is configured to receive first data from a remote clearinghouse and to control charging of the electric vehicle based at least in part on that received first data.

In some embodiments, the charge dispenser includes a controller, and a communication device configured to communicate with the clearinghouse. The controller is programmed and configured to receive the first data from the clearinghouse via the communication device and to control charge flow to the electric vehicle based at least in part on the first data.

In other embodiments, the first data includes data associated with the electric vehicle that is indicative of credits available for charge acquisition by the electric vehicle.

In yet other embodiments, the charge dispenser includes a port for receiving second data from a battery management system associated with the electric vehicle. This second data includes data identifying the electric vehicle. In these embodiments, the controller is programmed and configured to transmit the second data to the clearinghouse for authentication of a transaction involving the electric vehicle.

Other embodiments include those in which the DC voltage source includes an inverter connected to an AC voltage source.

Particular embodiments can differ in the kinds of communication devices used. For example, in some embodiments, the communication device includes a cellular transceiver, in others, it includes a telephone, and in yet others, it includes a network interface.

In some embodiments of the invention, the controller is configured to halt delivery of charge to the electric vehicle upon occurrence of a condition. Examples of such conditions include delivery of a predetermined charge, the predetermined charge being determined at least in part based on the first data. Another example of such a condition includes delivery of a predetermined charge, the predetermined charge being determined at least in part based on an exchange rate between credits recognized by the clearinghouse and a predetermined amount of charge per credit.

Also included within the embodiments of the invention are embodiments that include all combinations and permutations of the foregoing features.

In another aspect, the invention features an apparatus for managing charging of electric vehicles. Such an apparatus a clearinghouse in communication with a plurality of repletion sites, with a plurality of battery management systems in electric vehicles, and with a database including data indicative of credits available for use by users for charge acquisition. The clearinghouse includes a data processing system programmed and configured to provide first data to the charge dispenser. This first data is indicative of credits available for charge acquisition during a vehicle charging event. The data processing system is also configured to receive second data from a charge dispenser at a repletion site. This second data is indicative of an electric vehicle charging event.

In some embodiments, the clearinghouse includes a cellular transceiver for communication with the battery management systems and with the charge dispensers.

Other embodiments differ in the manner that the data in the database is keyed. In one embodiment, the database includes data keyed to cell phone numbers. In another, the the database includes data keyed to battery management systems.

Also included within the embodiments of the invention are embodiments that include all combinations and permutations of the foregoing features.

In another aspect, the invention features a method for charging an electric vehicle. Such a method includes receiving, from a remote clearinghouse, data indicative of credits that can be used for charge acquisition, and based at least in part on the data, allowing charge to flow to the electric vehicle.

In some practices, the method further includes determining a charge corresponding to the credits.

In other practices, the method also includes, upon detecting a termination condition, ceasing flow of charge to the electric vehicle.

Yet other practices include transmitting, to the clearinghouse, data indicative of a number of credits consumed in the course of charging the electric vehicle.

Also included within the embodiments of the invention are methods that include all combinations and permutations of the foregoing steps.

In another aspect, the invention includes a manufacture that includes a tangible and non-transitory computer-readable medium having encoded thereon instructions for causing a microcontroller to execute any of the foregoing methods.

These and other features of the invention will be apparent from the following detailed description, and the accompanying figures, in which:

DETAILED DESCRIPTION

Figure 1:
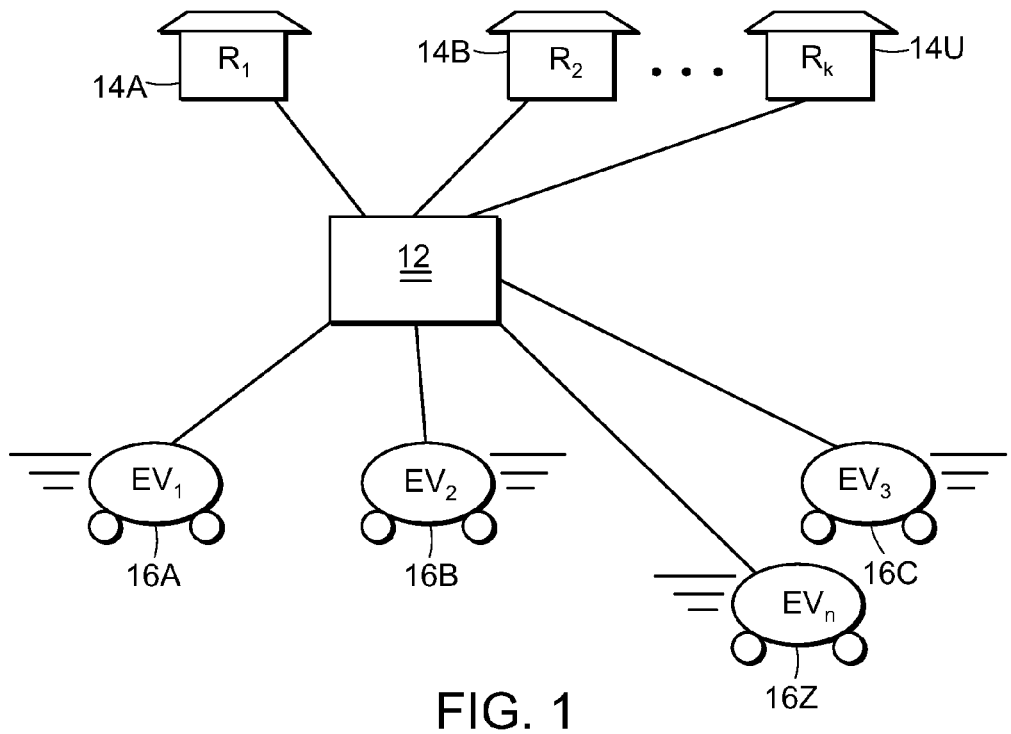
FIG. 1 is an overview of a distributed battery management system.

In one embodiment, shown in FIG. 1, a distributed battery management system 10 includes a central clearinghouse 12 in communication with repletion sites 14A-14U and electric vehicles 16A-16Z. Communication between the clearinghouse 12 and the repletion sites 14A-14U can be a circuit-switched connection, such as that provided via a cellular phone network, such as a GSM network or by a wired telephone link. Alternatively, communication can be established by a packet-switched connection, such as via a computer network, for example the Internet.

Figure 2:
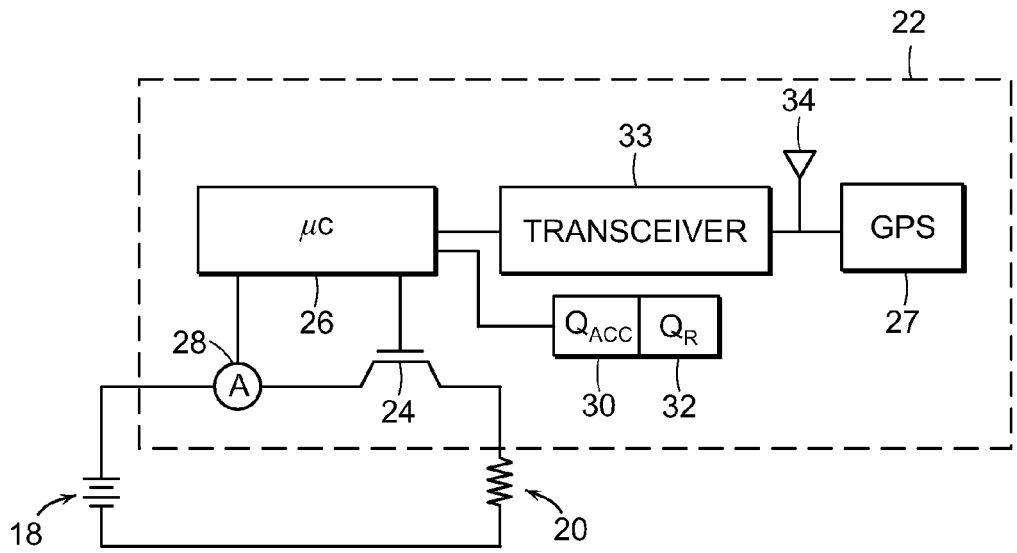
FIG. 2 shows the components within one of the electric vehicles shown in FIG. 1.

Referring now to FIG. 2, each electric vehicle 16A includes a battery 18 connected to an electric motor 20 by way of a gatekeeper 22. Charge flows from the battery 18 to the electric motor 20 by way of a power transistor 24, the gate terminal of which is controlled by a microcontroller 26 within the gatekeeper 22. In normal operation, the microcontroller 26 maintains a voltage at the gate terminal that allows current to flow between the source and drain terminals of the transistor 24.

The microcontroller 26 within the gatekeeper 22 receives data from a counter 28 that tracks a usage parameter indicative of an extent to which the battery 18 is used. In one embodiment, the counter 28 is a coulomb counter, and the usage parameter is how much charge flows from the battery 18. In this embodiment, the microcontroller 26 maintains a running total of drawn charge in an accumulation register 30. The microcontroller 26 periodically compares the drawn charge with a rationed charge stored in a rationed-charge register 32. When the drawn charge exceeds the rationed charge, the microcontroller 26 sends a signal to the gate terminal to prevent further current flow between source and drain. This prevents the electric vehicle 16A from moving under its own power.

In some embodiments, the microcontroller 26 determines when the drawn charge in the accumulation register 30 has almost reached the rationed charge in the rationed-charge register 32, at which point it alerts the driver. This feature is particularly useful for preventing the driver from being surprised by a loss of power at an inconvenient location and prompts the driver to visit a suitable repletion site 14 to carry out a repletion as described below.

In order to operate the electric vehicle 16A again, the driver must re-set the accumulation register 30 to zero. This requires the use of a transceiver 33 connected to the gatekeeper 22 via an antenna 34 for communication with the clearinghouse 12.

The process of re-setting the accumulation register 30, which is referred to as "repletion," begins with the driver going to one of the repletion sites 14A-14U in FIG. 1. The driver then provides information identifying his electric vehicle 16A and tenders payment for authorization to withdraw additional charge from the battery 18. The repletion site 14U then transmits a message to the clearinghouse 12 indicating that the driver has made such a payment. In response, the clearinghouse 12 transmits a message to the gatekeeper 22, which proceeds to re-set the accumulation register 30 and to re-set the maximum drawn charge to whatever the driver has paid for. This completes the repletion process.

Figure 3:
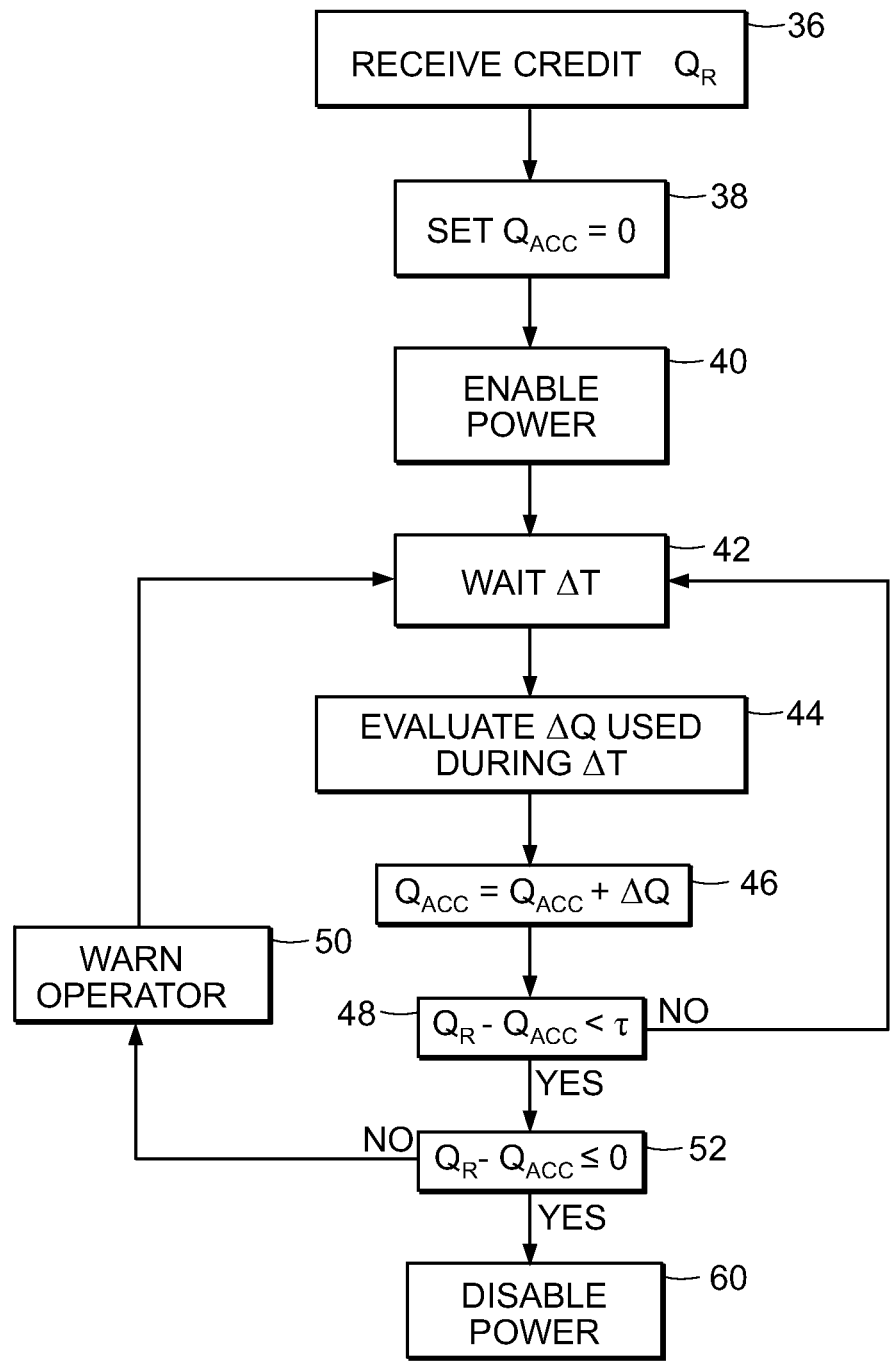
FIG. 3 shows a process carried out by a microcontroller in one of the electric vehicles in FIG. 1.

FIG. 3 shows an example process implemented by the microcontroller 26 following the step of receiving a repletion credit from the clearinghouse 12 for a ration of charge (step 36). The microcontroller 26 sets the accumulation register to zero (step 38) and enables current flow from the battery 18 (step 40). The microcontroller 26 then waits a suitable interval (step 42) and determines the amount of charge drawn in that interval (step 44). Then, the microcontroller 26 adds this amount to the accumulation register 30 (step 46). If the amount shown in the accumulation register 30 comes too close to the rationed charge amount (step 48) in the charge ration register 32, the microcontroller 26 sends a warning to the driver to find a repletion site 14A-14U (step 50). If the amount in the accumulation register reaches the rationed amount (step 52), the microcontroller 26 shuts down the electric vehicle 16A (step 60).

It is important to note that the distributed battery management system 10 described herein effectively decouples the process of charging the battery 18 from the process of using it. The battery 18 may be completely full of charge at the time the microcontroller 26 renders the electric vehicle 16A inoperable.

In effect, when the driver pays for repletion, he is paying for the right to use the battery 18. This provides a backhanded way of paying for the battery 18 itself independently of the charge in the battery. Since the battery 18 is effectively paid for over time through payment for the release of charge, the cost of the battery 18 no longer needs to be such a significant part of the cost of the electric vehicle 16A. This in turn allows the electric vehicle 16A to be sold at a price comparable to a conventional vehicle.

In another embodiment, the usage parameter is elapsed operating time. In this embodiment, the counter 28 is a time counter. The operation of such an embodiment is analogous to that described above in connection with FIG. 3.

Figure 4:
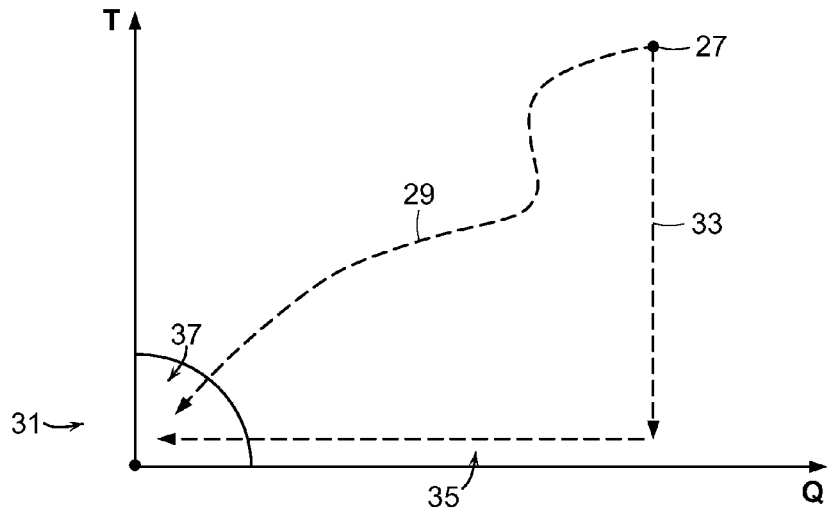
FIG. 4 shows trajectories of a usage parameter in a two-dimensional battery usage space for managing usage of the battery in FIG. 2.

In yet another embodiment, the usage parameter is a vector quantity rather than a scalar quantity. For example, the usage parameter can be a two-dimensional vector in which one element represents charge and the other represents elapsed time, as shown in FIG. 4. The act of repletion, in this case, can be viewed as establishing an initial location 27 of the usage parameter in the usage space. The microcontroller 26, using the output of the counter 28, determines a trajectory 29 of the usage parameter as it makes its way towards a designated end-point 31, at which point further usage of the vehicle 16A is forbidden. Some embodiments include a warning zone 37 surrounding the end-point 31 so that when a trajectory 29, 35 enters the warning zone 37, the microcontroller 26 issues a warning to the user of the electric vehicle 16A.

In some embodiments, the trajectory of the usage parameter is at all times parallel to the axes of the usage space. For example, in one embodiment, the microcontroller 26 first fully depletes time and then begins depleting charge. This is equivalent to a trajectory that with a first segment 33 parallel to the time axis until no time is left, and a second segment 35 that runs parallel to the charge axis until no charge is left. Conversely, the microcontroller 26 can deplete charge first and then time, with a corresponding impact on the trajectory of the usage parameter. In other embodiments, the trajectory 29 can involve depleting both time and charge according to some pre-defined function.

The usage space shown in FIG. 4 is a two-dimensional usage space. In the embodiments that rely only on depleting a scalar usage parameter, the usage space is one-dimensional. However, in principle nothing prevents the use of n indicia of usage to define an n-dimensional usage space. Examples of other indicia of usage that could be used, either alone or with others, are the distance travelled, either measured mechanically by an odometer or tracked via GPS data.

Figure 5:
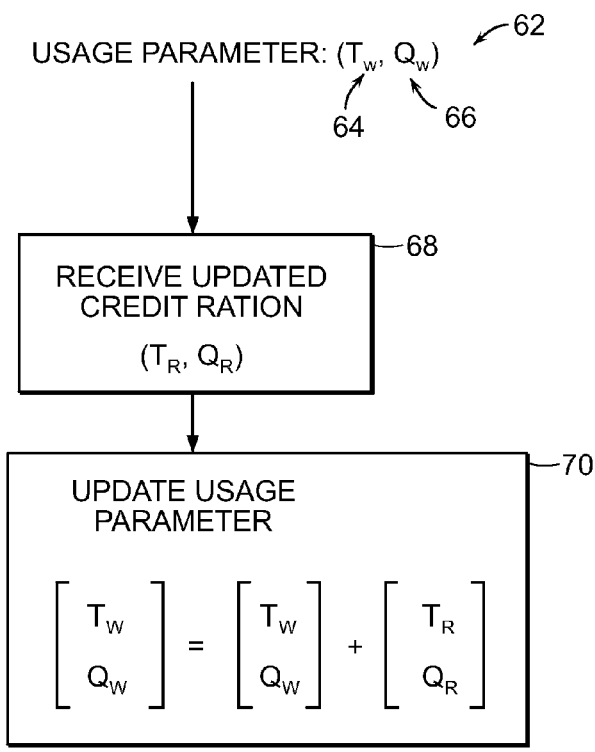
FIG. 5 shows a task carried out by a repletion site for providing additional rations for usage of the battery in FIG. 2.
Figure 6:
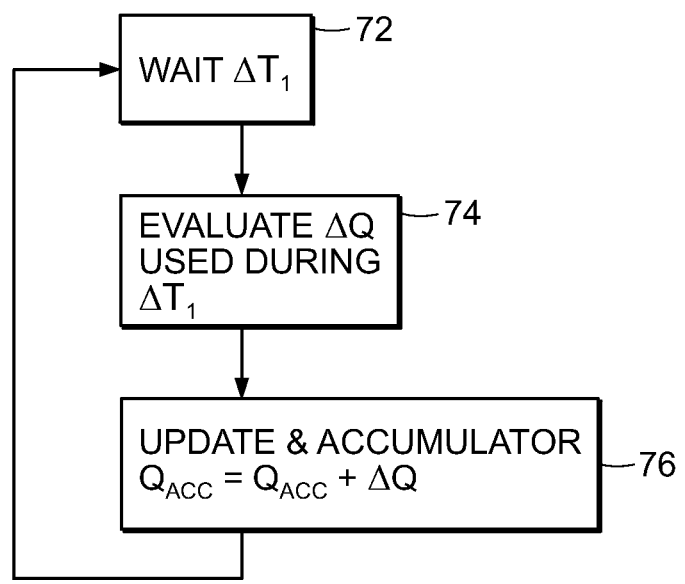
FIG. 6 shows a task carried out by the microcontroller to track usage of charge from the battery in FIG. 2.
Figure 7:
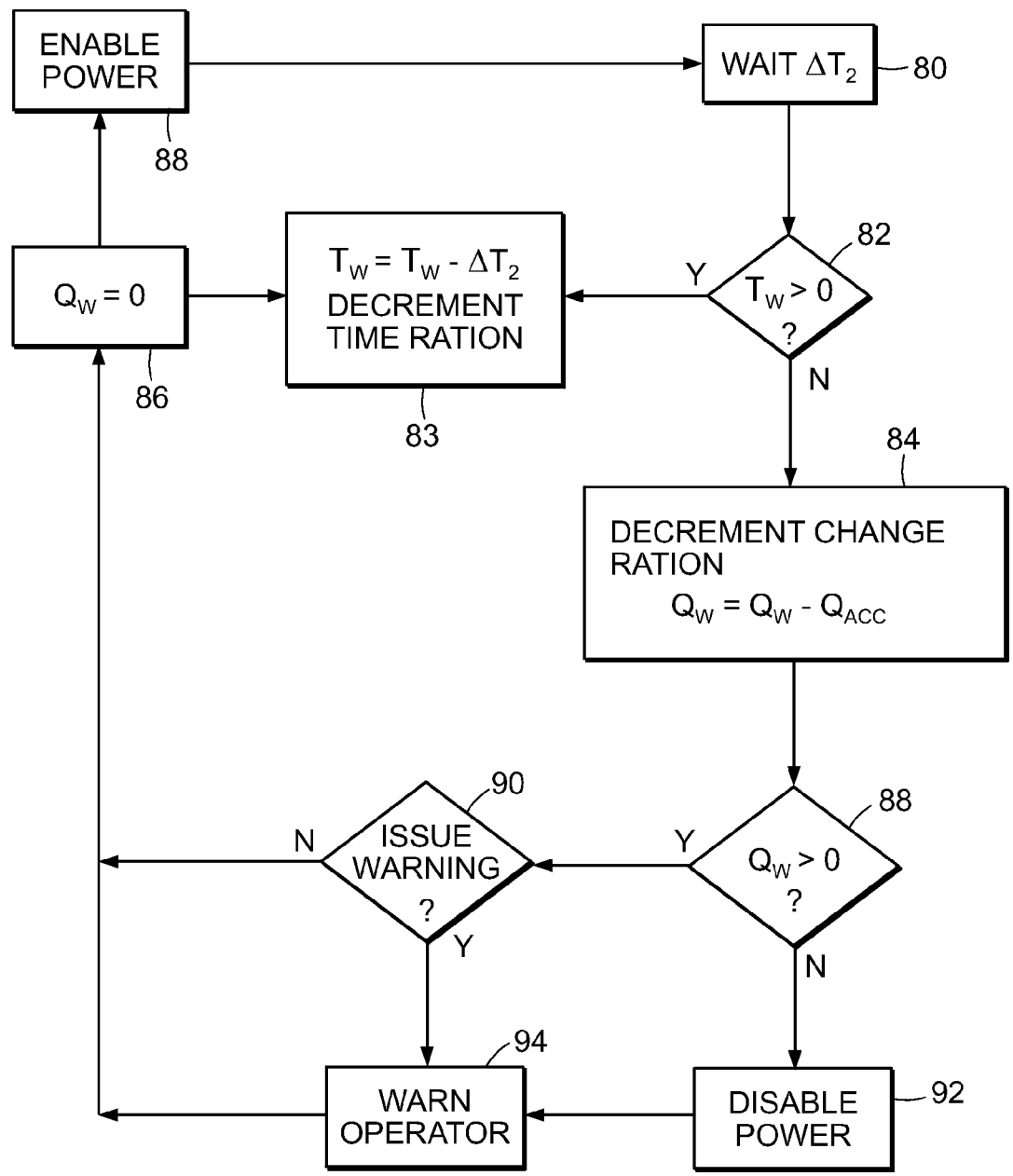
FIG. 7 shows a task carried out by the microcontroller to implement a particular trajectory in the battery usage space of FIG. 4.

FIGS. 5-7 show the operation of an embodiment in which the usage parameter is a two-dimensional vector having a time ration and an energy ration.

FIG. 5 shows a task carried out at a repletion site 14A. The usage parameter 62 in this example is a two-dimensional vector having both a time ration $T_r$ 64 and a charge ration $Q_r$ 66. The clearinghouse 12 receives, from the repletion site 14A, a ration update indicating that payment for a vector ($T_r$, $Q_r$) has been received (step 68). The clearinghouse 12 then updates the usage parameter for the user by incrementing the current value of the usage parameter ($T_w$, $Q_w$) by the additional ration ($T_r$, $Q_r$) (step 70).

FIG. 6 shows a first task carried out by the microcontroller 26 during operation of the vehicle 16A. The microcontroller 26 waits a first time interval $\Delta T_1$ (step 72) after which it evaluates an amount of charge DQ used during that interval (step 74). The microcontroller 26 then increments an accumulator $Q_{acc}$ by that amount of charge DQ (step 76). Thus, the accumulator $Q_{acc}$ maintains a running total of charge that has been used since it was last reset.

FIG. 7 shows a second task carried out by the microcontroller 26 during operation of the vehicle 16A. The task begins with enabling charge flow from the battery 18 to the motor 20 (step 78). The microcontroller 26 then waits for a second time interval $\Delta T_2$ that is longer than the first time interval $\Delta T_1$ (step 80). The microcontroller 26 then inspects the available time ration $T_w$ (step 82). If there is any remaining time ration $T_w$, the microcontroller 26 decrements it by the second time interval $\Delta T_2$ (step 83) and then resets the accumulator $Q_{acc}$ (step 86). This has the effect of ensuring that the time ration $T_w$ is used before the charge ration $Q_w$.

On the other hand, if the available time ration $T_w$ is exhausted (step 82), the microcontroller 26 begins depleting the charge ration $Q_w$ (step 84). If any charge ration $Q_w$ remains (step 88), the microcontroller 26 checks to see if the remaining charge ration $Q_w$ is low enough to warrant issuing a warning (step 90). If a warning is appropriate, the microcontroller 26 issues one (step 94). In either case, execution proceeds with resetting the accumulator $Q_w$ (step 86).

If, on the other hand, no charge ration $Q_w$ remains, the microcontroller 26 disables power flow from the battery 18 (step 92).

Viewed more broadly, the apparatus disclosed herein is a system for controlling battery operation in a remote electric vehicle 16A in response to some triggering event. In the embodiment described above, the event is the occurrence of equality between a rationed charge and an accumulated charge. However, in alternative embodiments, the distributed battery management system 10 can operate as a theft deterrent. If an electric vehicle 16A is stolen, the vehicle's owner may communicate with the clearinghouse 12 to provide information concerning the theft, at which point the clearinghouse 12 may issue a signal to cause the microcontroller 26 of the stolen electric vehicle 16A to shut down the battery 18. If an electric vehicle 16A is involved in illegal activity, for example in a car chase, police may seek a warrant to communicate with the clearinghouse 12 and cause the electric vehicle 16A to be abruptly shut down. A lessor or electric vehicles 16A-16Z may program the microcontroller 26 to shut down operation at the end of the lease period.

An optional GPS unit 27 provides a host of other triggering events related to location. For example, a dealer offering electric vehicles 16A-16Z for test drives may wish to provide a way to prevent electric vehicles 16A-16Z from being driven too far away from the dealership.

Control in response to a triggering event need not involve complete shut-down but may also involve throttling. For example, one may limit the rate of charge flow, thus controlling the power output and hence the vehicle's maximum velocity. In such cases, the presence of data from a GPS unit 27, together with data representative of speed limits in various locations provides a way to enforce speed limits.

A more benign use of the GPS unit 27 is to communicate with a database of repletion stations and to identify a repletion station that is nearby. This is useful for drivers who may find that their accumulated discharge is approaching their charge ration.

A variety of electric vehicles can be used with the system described herein. However, a particularly attractive choice of electric vehicle is a motorcycle. Motorcycles are relatively light weight and tend to be used for short trips at low speed. As such, the use of a battery in a motorcycle is eminently practical. Moreover, many motorcycles are use highly polluting two-stroke engines. Replacement of such engines with an electric motor would thus offer significant environmental advantages.

Figure 8:
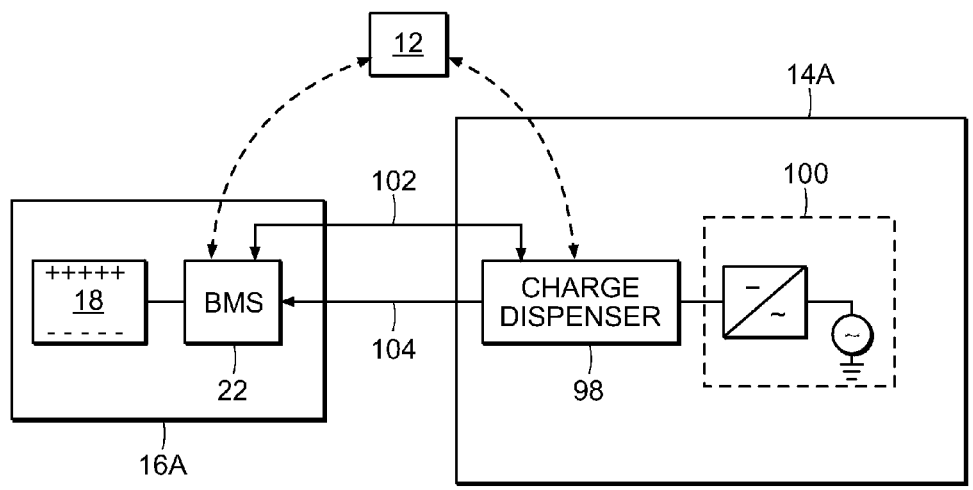
FIG. 8 shows the battery of FIG. 2 being charged by a charge management system.

In some embodiments, as shown in FIG. 8 the repletion site 14A features a charge dispenser 98 connected between a charging source 100 and an electric vehicle 16A to be charged. The charge dispenser 98 manages both the dispensation of electric charge to a battery 18 of an electric vehicle 16A as well as accounting and payment for the dispensed charge.

The clearinghouse 12 is in communication with both the gatekeeper 22 on the electric vehicle 16A and with the charge dispenser 98 at the repletion site 14A. This communication is typically via a cellular link.

Figure 9:
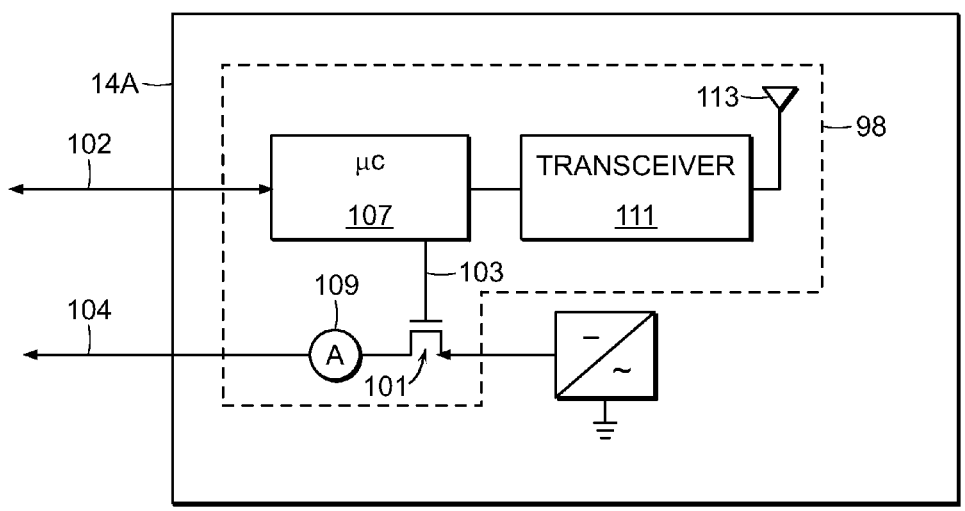
FIG. 9 shows components of the charge dispenser in FIG. 8.

Referring now to FIG. 9, the charge dispenser 98 includes a power transistor 101, a gate terminal 103 of which is controlled by a microcontroller 107 within the charge dispenser 98. In normal operation, the microcontroller 107 maintains a voltage at the gate terminal 103 when charge is authorized to flow towards the electric vehicle 16A and removes that voltage to shut off the flow of charge.

The microcontroller 107 determines how much charge is permitted to flow based on information received from the clearinghouse 12 via a transceiver 111 connected to an antenna 113. During the charging operation, the microcontroller 107 receives data from a counter 109 that tracks a charging parameter indicative of an amount of charge that has been delivered. In one embodiment, the counter 109 is a coulomb counter.

In operation, when an electric vehicle 16A is to be charged, its gatekeeper 22 establishes communication with the charge dispenser 98 via a control link 102. In addition, a charging link 104 for transfer of charge connects the charge dispenser 98 and the gatekeeper 22.

Figure 10:
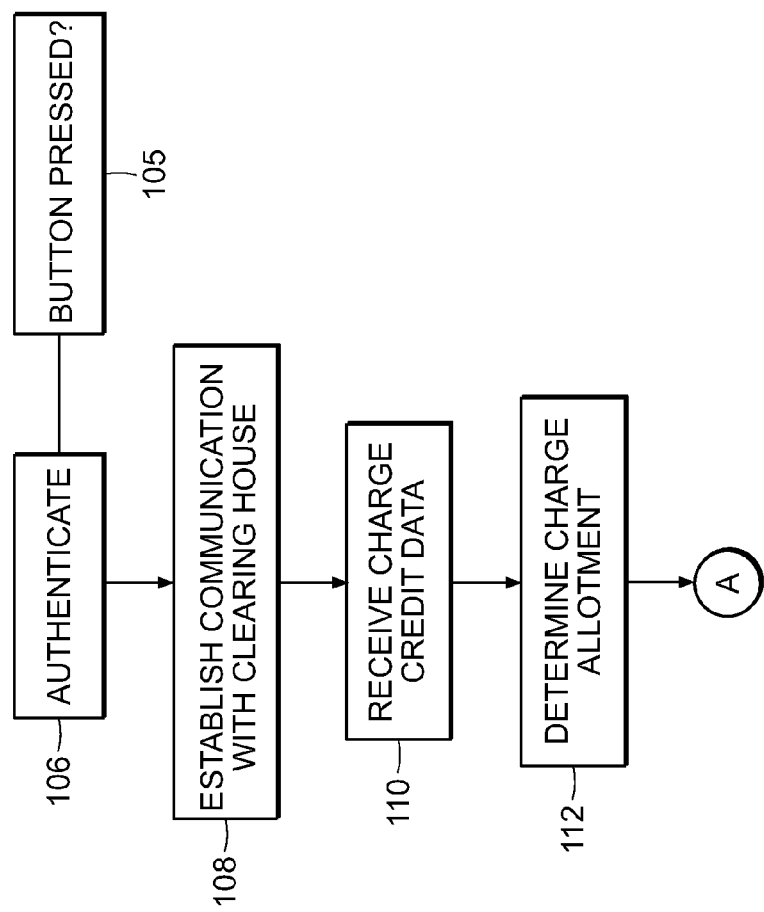

Once connection is made, the charge dispenser 98, and in particular a controller within the charge dispenser 98, executes the procedure shown in FIG. 10, beginning with the step of receiving a signal indicating that a user has initiated a transaction, for example by pressing a "START" button (step 105). This begins the process of authenticating the gatekeeper 22 (step 106). The charge dispenser 98 then establishes communication with the control clearinghouse 12 (step 108) and provides it with the identity of the gatekeeper 22. In response, the clearinghouse 12 identifies an account associated with the identified gatekeeper 22 and determines how much credit is available and transmits that credit data to the charge dispenser 98 (step 110). At that point, the charge dispenser 98 determines a charge allotment, which represents an upper limit on how many coulombs of charge can be transferred (step 112).

In one practice, the exchange rate between credits and coulombs of charge is not fixed, but can be set by the proprietor of the repletion site 14A based on the proprietor's business objectives. This enables proprietors of repletion sites 14A-14C to compete on price in much the same way gas stations compete. If desired, the relationship between exchange rate and coulombs transferred can be non-linear. For example, to discourage lingering at the charging station, a proprietor may increase the cost of coulombs delivered later in the charging cycle.

Figure 11:
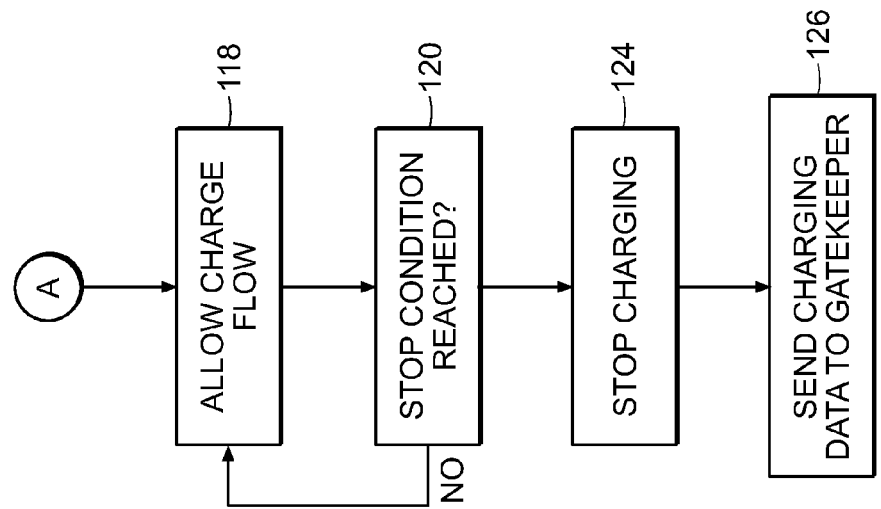
FIGS. 10-11 are flow charts of a procedure followed by the charge management system shown in FIG. 8 when the vehicle to be charged uses the battery management system shown in FIG. 1.

Once the charge allotment is determined (step 112), the charge dispenser 98 begins a charging procedure as shown in FIG. 11.

Referring now to FIG. 11, in response, the charge dispenser 98 allows charge to flow to the electric vehicle 16A (step 116). As it does so, the charge dispenser 98 watches for the occurrence of a termination event (step 118). Examples of termination events include the transfer of enough charge to meet the charge allotment, the disconnection of the vehicle 16A, the activating of an "off" switch, or the transfer of charge sufficient to meet an operator-defined amount that is less than the charge allotment.

Upon occurrence of the termination event, the charge dispenser 98 stops the charging process (step 124) and sends the clearinghouse 12 information concerning the credits consumed in the transaction (step 120).

Figure 12:
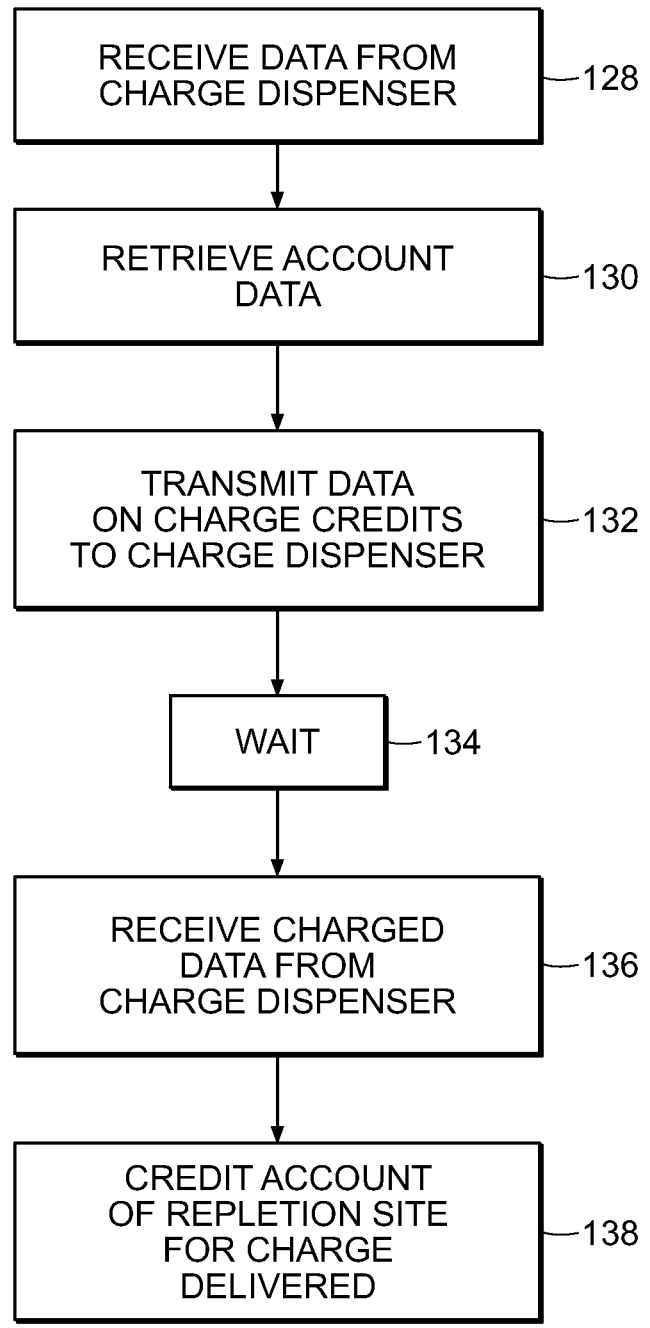
FIG. 12 is a flow chart of a procedure followed by the clearinghouse of FIG. 1 during the charging operation.

FIG. 12 shows steps taken by the clearinghouse 12 during the processes shown in FIGS. 9-10.

The clearinghouse 12 first receives data from the charge dispenser 98 identifying the gatekeeper 22 (step 128). The clearinghouse 12 then retrieves account data associated with that gatekeeper 22 (step 130) and transmits to the charge dispenser 98 information about charging credits present in that account (step 132). After that, the clearinghouse 12 waits for the next communication from the charge dispenser 98 (step 134).

The next communication from the charge dispenser 98 brings with it information concerning the amount of charge dispensed (step 136).

The clearinghouse 12 then adjusts the account corresponding to the identified gatekeeper 22 and transfers value to an account associated with the repletion site 14A (step 138). The amount of this value is selected to provide the repletion site 14A sufficient economic incentive to participate in distribution of electric charge to batteries of electric vehicles 16A.

In some cases, an electric vehicle 16A may have a conventional battery management system that lacks the capabilities of the gatekeeper 22 described in FIG. 2. To accommodate such cases, the operator of an electric vehicle 16A maintains an account with the clearinghouse 12 with the account being identified by a cell phone. In such cases, the control link 102 shown in FIG. 8 is not present. Instead, the operator communicates with the clearinghouse 12 using his cell phone to identify the charge dispenser 98. Only the charging link 104 is needed. Since it is the cell phone that transmits the communication, no further authentication is needed. The remainder of the procedure is as described in FIGS. 10-11.

Having described the invention and a preferred embodiment thereof, what is new and claimed by Letters Patent is:

1. An apparatus for charging an electric vehicle, said apparatus comprising a DC voltage source, and a charge dispenser connected to said DC voltage source, said charge dispenser being configured to receive first data from a remote clearinghouse and to control charging of said electric vehicle based at least in part on said received first data.

2. The apparatus of claim 1, wherein said charge dispenser comprises a controller, and a communication device configured to communicate with said clearinghouse, wherein said controller is configured to receive said first data from said clearinghouse via said communication device and to control charge flow to said electric vehicle based at least in part on said first data.

3. The apparatus of claim 1, wherein said first data comprises data associated with said electric vehicle, said data associated with said electric vehicle being indicative of credits available for charge acquisition by said electric vehicle.

4. The apparatus of claim 2, wherein said charge dispenser comprises a port for receiving second data from a battery management system associated with said electric vehicle, said second data comprising data identifying said electric vehicle, and wherein said controller is configured to transmit said second data to said clearinghouse for authentication of a transaction involving said electric vehicle.

5. The apparatus of claim 1, wherein said DC voltage source comprises an inverter connected to an AC voltage source.

6. The apparatus of claim 2, wherein said communication device comprises a cellular transceiver.

7. The apparatus of claim 2, wherein said communication device comprises a telephone.

8. The apparatus of claim 2, wherein said communication device comprises a network interface.

9. The apparatus of claim 2, wherein said controller is configured to halt delivery of charge to said electric vehicle upon occurrence of a condition.

10. The apparatus of claim 2, wherein said controller is configured to halt delivery of charge to said electric vehicle upon delivery of a predetermined charge, said predetermined charge being determined at least in part based on said first data.

11. The apparatus of claim 2, wherein said controller is configured to halt delivery of charge to said electric vehicle upon delivery of a predetermined charge, said predetermined charge being determined at least in part based on an exchange rate between credits recognized by said clearinghouse and a predetermined amount of charge per credit.

12. An apparatus for managing charging of electric vehicles, said apparatus comprising a clearinghouse in communication with a plurality of repletion sites, with a plurality of battery management systems in electric vehicles, and with a database comprising data indicative of credits available for use by users for charge acquisition, said clearinghouse comprising a data processing system programmed and configured to provide first data to said charge dispenser, said first data being indicative of credits available for charge acquisition during a vehicle charging event, and to receive second data from a charge dispenser at a repletion site, said second data being indicative of an electric vehicle charging event.

13. The apparatus of claim 12, wherein said clearinghouse comprises a cellular transceiver for communication with said battery management systems and with said charge dispensers.

14. The apparatus of claim 12, wherein said database comprises data keyed to cell phone numbers.

15. The apparatus of claim 12, wherein said database comprises data keyed to battery management systems.

16. A method for charging an electric vehicle, said method comprising receiving, from a remote clearinghouse, data indicative of credits that can be used for charge acquisition, and based at least in part on said data, allowing charge to flow to said electric vehicle.

17. The method of claim 16, further comprising determining a charge corresponding to said credits.

18. The method of claim 16, further comprising, upon detecting a termination condition, ceasing flow of charge to said electric vehicle.

19. The method of claim 16, further comprising, transmitting, to said clearinghouse, data indicative of a number of credits consumed in the course of charging said electric vehicle.

* * * * *